US006363355B1

(12) United States Patent
Morrison et al.

(10) Patent No.: US 6,363,355 B1
(45) Date of Patent: Mar. 26, 2002

(54) METHOD AND APPARATUS FOR OPERATING A SELF-SERVICE CHECKOUT SYSTEM HAVING A NUMBER OF RETAIL TERMINALS ASSOCIATED THEREWITH

(75) Inventors: James Morrison, Suwanee; John C. Addy, Lawrenceville; Robert F. Sadler, Cumming, all of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/217,539

(22) Filed: Dec. 21, 1998

(51) Int. Cl.[7] ............................................... G06F 17/60
(52) U.S. Cl. ........................... 705/23; 705/16; 902/22; 235/383; 186/59; 186/64
(58) Field of Search .......................... 705/16, 17, 20, 705/21, 23, 29, 34, 43; 902/22; 235/383; 186/59, 61, 62, 64

(56) References Cited

U.S. PATENT DOCUMENTS

| | | | |
|---|---|---|---|
| 4,779,706 A | * 10/1988 | Mergenthaler | 186/61 |
| 4,792,018 A | * 12/1988 | Humble et al. | 186/61 |
| 4,929,819 A | * 5/1990 | Collins, Jr. | 235/383 |
| 5,437,346 A | * 8/1995 | Dumont | 186/61 |
| 5,468,942 A | * 11/1995 | Oosterveen et al. | 235/383 |

(List continued on next page.)

FOREIGN PATENT DOCUMENTS

WO        WO-94/22105        * 9/1994

OTHER PUBLICATIONS

Anonymous, "Consumers to Check Out Technology to Save Time at Check–Out", Automatic I.D. News, vol. 13, No. 8, Jul. 1997.*
Anonymous, "Balls Food Stores Chooses NCR Self–Checkout Solution", Dialog File 813:PR Newswire, Feb. 23, 1998.*
Purpura, Linda, "H–E–B Tests Portable Self–Scanning Techology in Store", Supermarket News, vol. 48, No. 21, May 25, 1998.*
Anonymous, "Meijer to Adopt Self–Checkout", Discount Store News, vol. 37, No. 18, Sep. 21, 1998.*
Anonymous, "Self–Serve a the Checkout Lane", The New York Times, Abstract, Jun. 14, 1990.*

*Primary Examiner*—James P. Trammell
*Assistant Examiner*—John W. Hayes
(74) *Attorney, Agent, or Firm*—Maginot, Addison & Moore LLP (57) ABSTRACT

A method of operating a self-service checkout system which includes a base having a scanner secured thereto includes the step of securing an itemization-only retail terminal to the base. The method also includes the step of coupling the itemization-only retail terminal to the scanner. The method further includes the step of operating the itemization-only retail terminal and the scanner so as to allow a first user to enter a first number of items for purchase into the self-service checkout system for a first time period while (i) the itemization-only retail terminal is secured to the base, and (ii) the itemization-only retail terminal is coupled to the scanner. Moreover, the method includes the step of detaching the itemization-only retail terminal from the base. Yet further, the method includes the step of decoupling the itemization-only retail terminal from the scanner. The method further includes the step of securing a full-tendering retail terminal to the base. The method also includes the step of coupling the full-tendering retail terminal to the scanner. Finally, the method includes the step of operating the full-tendering retail terminal and the scanner so as to allow a second user to enter a second number of items for purchase into the self-service checkout system for a second time period while (i) the full-tendering retail terminal is secured to the base, and (ii) the full-tendering retail terminal is coupled to the scanner. A self-service checkout system is also disclosed.

10 Claims, 6 Drawing Sheets

U.S. PATENT DOCUMENTS

| | | | | |
|---|---|---|---|---|
| 5,560,450 A | * | 10/1996 | Kouno | 186/61 |
| 5,747,784 A | * | 5/1998 | Walter et al. | 235/383 |
| 5,752,582 A | * | 5/1998 | Hayward | 186/61 |
| 5,952,642 A | * | 9/1999 | Lutz | 235/383 |
| 5,967,264 A | * | 10/1999 | Lutz et al. | 186/61 |
| 5,978,772 A | * | 11/1999 | Mold | 705/16 |
| 5,992,570 A | * | 11/1999 | Walter et al. | 186/61 |
| 6,032,128 A | * | 2/2000 | Morrison et al. | 705/23 |
| 6,062,477 A | * | 5/2000 | Wike, Jr. et al. | 235/383 |
| 6,167,381 A | * | 12/2000 | Swaine et al. | 705/17 |

* cited by examiner

METHOD AND APPARATUS FOR OPERATING A SELF-SERVICE CHECKOUT SYSTEM HAVING A NUMBER OF RETAIL TERMINALS ASSOCIATED THEREWITH

TECHNICAL FIELD OF THE INVENTION

The present invention relates generally to a self-service checkout system, and more particularly to a method and apparatus for operating a self-service checkout system having a number of retail terminals associated therewith.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout systems developed which attempt to substantially eliminate the need for a checkout clerk.

A self-service checkout system is operated by a customer without the aid of a checkout clerk. Hence, during operation of a self-service checkout system, the customer scans individual items for purchase across a scanner and then places the scanned items into a grocery bag, if desired. The customer then pays for his or her purchases either at the self-service checkout system if so equipped, or at a central payment area which is staffed by a store employee. Thus, a self-service checkout system permits a customer to select, itemize, and in some cases pay for his or her purchases without the assistance of the retailer's personnel.

It should be appreciated that a given retailer may have a number of reservations in regard to implementation of self-service checkout systems into the retailer's operation. For example, a self-service checkout system is typically more expensive than an assisted checkout system (i.e. a retail checkout system which is operated by an employee of the retailer such as a checkout clerk). The higher cost associated with a self-service checkout system is typically due to the fact that the system itself must perform functions that would normally be performed by the retail clerk with the checkout system thereby increasing the number of components associated with the self-service checkout system. For instance, in the case of a self-service checkout system, the system must provide security from improprieties such as theft. Moreover, in certain self-service checkout systems, the checkout system itself must collect payment from the customer for his or her items for purchase. It is the cost of the hardware and software necessary to provide such functions to the self-service checkout system which causes the cost of the system to typically exceed the cost of an assisted checkout system. Such increased costs are particularly detrimental if the retailer also fears that the retailer's customers may not embrace the idea of using self-service checkout systems to checkout their items for purchase thereby potentially causing the systems to go unused.

What is needed therefore is a self-service checkout system which overcomes one or more of the above-mentioned drawbacks. What is particularly needed is a low-cost, upgradable self-service checkout system which advantageously reduces the costs associated with implementation of the system into a retailer's operation.

SUMMARY OF THE INVENTION

In accordance with a first embodiment of the present invention, there is provided a method of operating a self-service checkout system having a scanner. The method includes the step of coupling an itemization-only retail terminal to the scanner. The method also includes the step of operating the itemization-only retail terminal and the scanner so as to allow a first user to enter a first number of items for purchase into the self-service checkout system for a first time period while the itemization-only retail terminal is coupled to the scanner. Moreover, the method includes the step of decoupling the itemization-only retail terminal from the scanner. Yet further, the method includes the step of coupling a full-tendering retail terminal to the scanner. In addition, the method includes the step of operating the full-tendering retail terminal and the scanner so as to allow a second user to enter a second number of items for purchase into the self-service checkout system for a second time period while the full-tendering retail terminal is coupled to the scanner.

In accordance with a second embodiment of the present invention, there is provided a method of operating a self-service checkout system which includes a base having a scanner secured thereto. The method includes the step of securing an itemization-only retail terminal to the base. The method also includes the step of coupling the itemization-only retail terminal to the scanner. The method further includes the step of operating the itemization-only retail terminal and the scanner so as to allow a first user to enter a first number of items for purchase into the self-service checkout system for a first time period while (i) the itemization-only retail terminal is secured to the base, and (ii) the itemization-only retail terminal is coupled to the scanner. Moreover, the method includes the step of detaching the itemization-only retail terminal from the base. Yet further, the method includes the step of decoupling the itemization-only retail terminal from the scanner. The method further includes the step of securing a full-tendering retail terminal to the base. The method also includes the step of coupling the full-tendering retail terminal to the scanner. Finally, the method includes the step of operating the full-tendering retail terminal and the scanner so as to allow a second user to enter a second number of items for purchase into the self-service checkout system for a second time period while (i) the full-tendering retail terminal is secured to the base, and (ii) the full-tendering retail terminal is coupled to the scanner.

In accordance with a third embodiment of the present invention, there is provided a self-service checkout system. The self-service checkout system a base having a counter secured thereto and a scanner secured to the counter. The self-service checkout system also includes an itemization-only retail terminal which is removably secured to the base. The itemization-only retail terminal has a first processing unit. Moreover, the itemization-only retail terminal is configured to allow a user to enter a first number of items for purchase into the self-service checkout system during a first time period when (i) the itemization-only retail terminal is secured to the base, and (ii) the first processing unit is electrically coupled to the scanner. Yet further, the self-service checkout system includes a full-tendering retail terminal which is removably secured to the base. The full-tendering retail terminal has a second processing unit. Moreover, the full-tendering retail terminal is configured to allow the user to enter a second number of items for purchase into the self-service checkout system during a second time period when (i) the full-tendering retail terminal is secured to the base, and (ii) the second processing unit is electrically coupled to the scanner.

It is therefore an object of the present invention to provide a new and useful self-service checkout system.

It is moreover an object of the present invention to provide an improved self-service checkout system.

It is a further object of the present invention to provide a new and useful method of operating a self-service checkout system.

It is also an object of the present invention to provide an improved method of operating a self-service checkout system.

It is yet another object of the present invention to provide a low-cost, upgradable self-service checkout system which advantageously reduces the costs associated with implementation of the system into a retailer's operation.

The above and other objects, features, and advantages of the present invention will become apparent from the following description and the attached drawings.

DETAILED DESCRIPTION OF THE INVENTION

While the invention is susceptible to various modifications and alternative forms, a specific embodiment thereof has been shown by way saga of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIGS. 1–4, there is shown a retail system having a number of a self-service checkout systems 10 for use in a retail business such as a grocery store. Each of the self-service checkout systems 10 includes a status light device 11, a product scale 12, a scanner 14, and a security device 48 such as weight scale positioned so as to weigh the contents of a grocery bag or the like. Each of the self-service checkout systems 10 also includes a retail terminal. In particular, a number of the self-service checkout systems 10 includes a full-tendering retail terminal such as an automated teller machine (ATM) 24, whereas the remainder of the self-service checkout systems 10 include an itemization-only retail terminal such as a kiosk-type information terminal 50. What is meant herein by the term "full-tendering retail terminal" is a retail terminal which includes the components necessary to allow a customer to not only itemize (i.e. enter) his or her items for purchase, but also tender payment for his or her items for purchase by use of the retail terminal itself. Examples of components which allow a customer to tender payment for his or her items for purchase include cash acceptors/dispensers and debit/credit/smart card readers. Moreover, what is meant herein by the term "itemization-only retail terminal" is a retail terminal which includes the components necessary to allow a customer to itemize (i.e. enter) his or her items for purchase and thereafter generate indicia such as a paper or electronic payment ticket which may be utilized by the customer to tender payment for his or her items for purchase at another location such as a remote payment terminal 52. Hence, it should be appreciated that as used herein, an itemization-only retail terminal is not utilized to allow a customer to tender payment, but rather is operated only to allow a customer to itemize (i.e. enter) his or her items for purchase into the self-service checkout system 10.

The self-service checkout systems 10 which include a full-tendering retail terminal (e.g. the ATM 24) are hereinafter referred to as full-tendering self-service checkout systems 100, whereas the self-service checkout systems 10 which include a itemization-only retail terminal (e.g. the kiosk-type information terminal 50) are hereinafter referred to as itemization-only self-service checkout systems 200.

Figure 2:
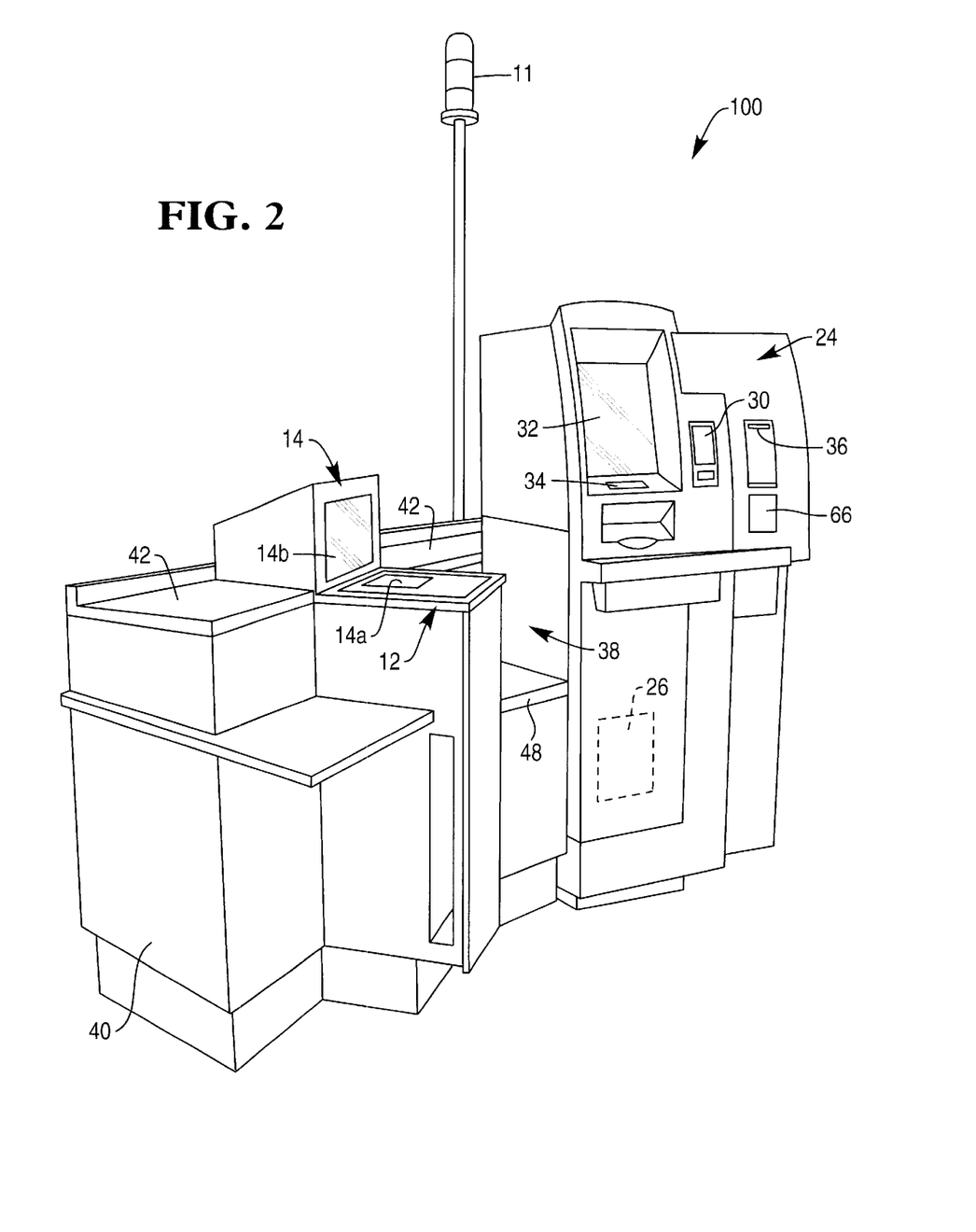
FIG. 2 is a perspective view of a full-tendering self-service checkout system of the retail system of FIG. 1.

The ATM 24 of the full-tendering self-service checkout system 100 includes the components necessary to allow a user of the system 100 (e.g. a customer) to enter his or her items for purchase and thereafter pay for the same at the system 100 itself. In particular, in addition to the scanner 14 and the product scale 12, the full-tendering self-service checkout system 100 includes a card reader 30, a display monitor 32, a keypad 34, a printer 36, and a processing unit 26.

Figure 3:
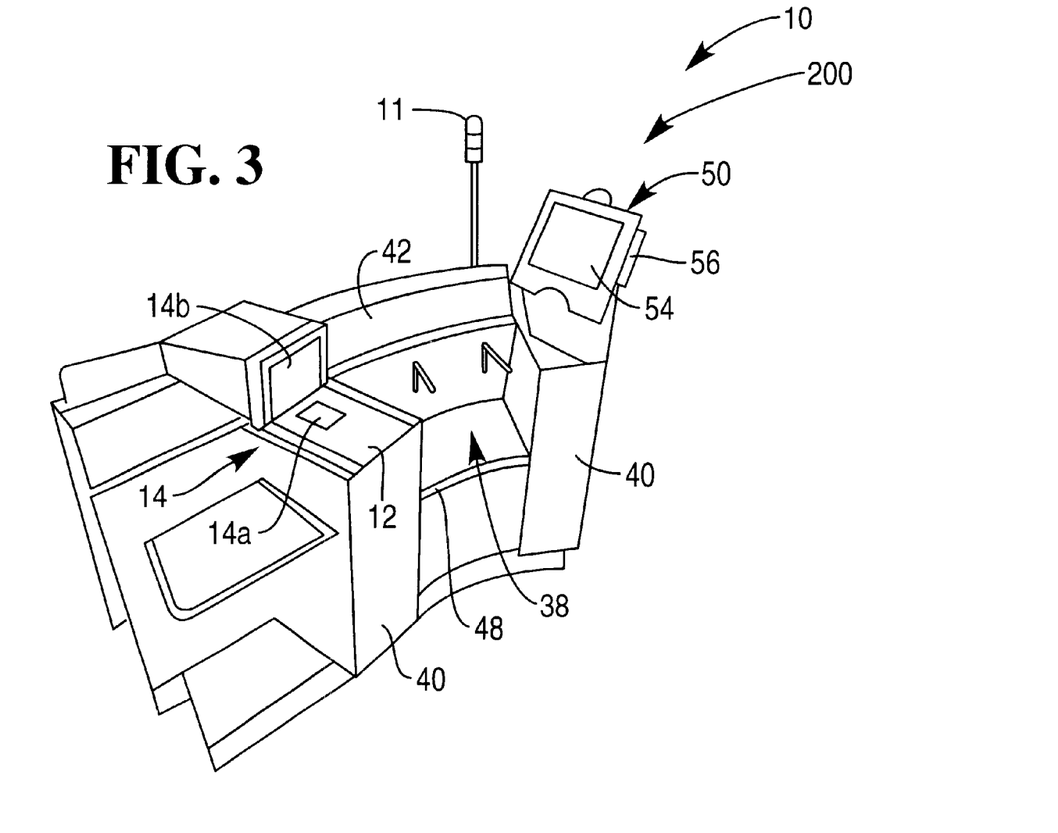
FIG. 3 is a perspective view of a itemization-only self-service checkout system of the retail system of FIG. 1.
Figure 4:
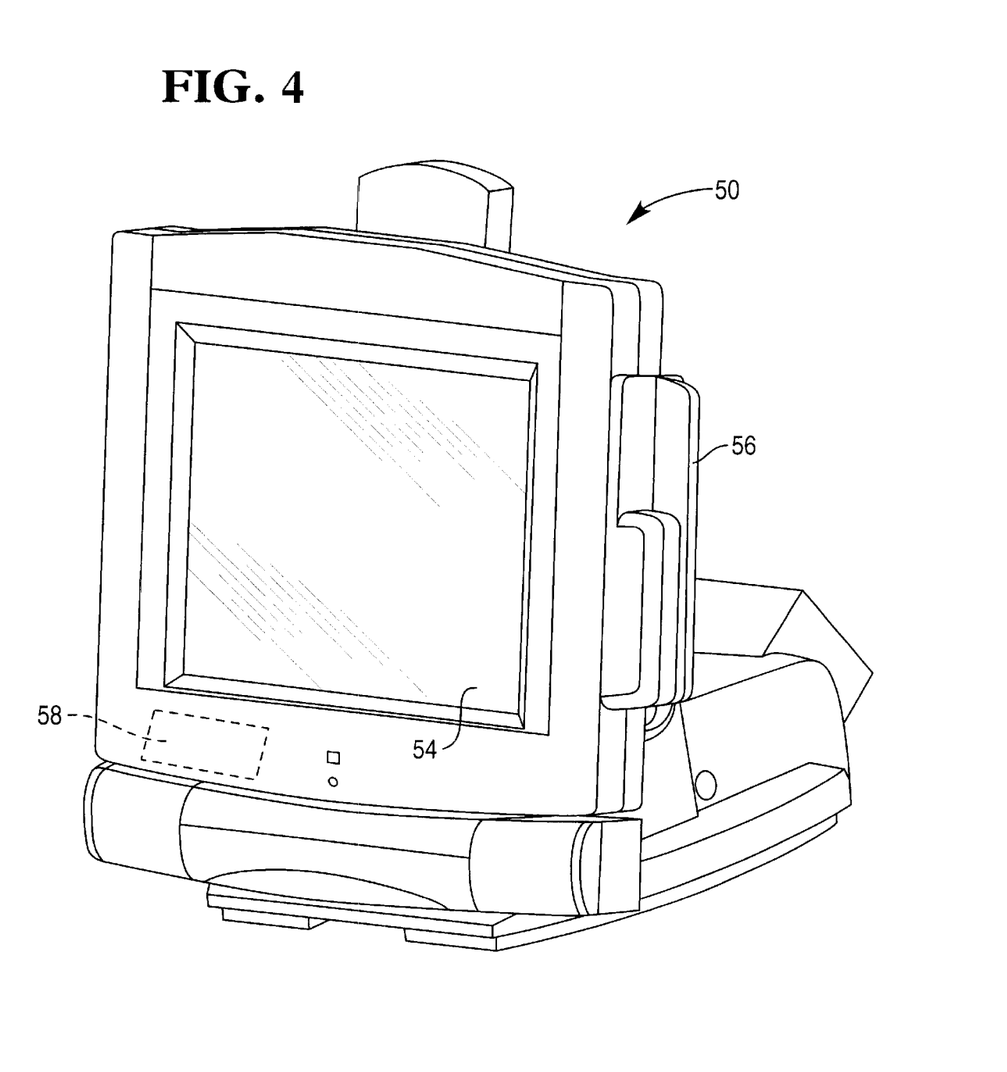
FIG. 4 is a perspective view showing the kiosk-type retail terminal of the itemization-only self-service checkout system of FIG. 3, note that the kiosk-type information terminal has been removed from the itemization-only self-service checkout system for clarity of description.

The kiosk-type information terminal 50 of the itemization-only self-service checkout system 200 includes the components necessary to allow a customer to enter his or her items for purchase into the system 200, but payment for his or her items is tendered at the remote payment terminal 52. In particular, the kiosk-type information terminal 50 includes a display monitor 54, a card reader 56, and a processing unit 58. As described below, it should be appreciated that the card reader 56 is utilized to allow a customer to swipe his or her loyalty card, but is typically not utilized to enter debit or credit cards. One such kiosk-type information terminal which is particularly useful as the kiosk-type information terminal of the present invention is an Informa model information terminal which is commercially available from NCR Corporation of Dayton, Ohio.

Each of the self-service checkout systems 10 also includes a bagwell 38 for accommodating one or more grocery bags (not shown) and a base 40 having a counter 42 secured thereto. The counter 42 defines an arcuate surface as shown in FIGS. 2–3. Such an arcuate surface allows the scanner 14 to be positioned relatively close or otherwise proximate the ATM 24 or the kiosk-type information terminal 50 and hence the components associated therewith. Such a configuration facilitates a customer's use of the self-service checkout systems 10. Moreover, the bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

Figure 1:
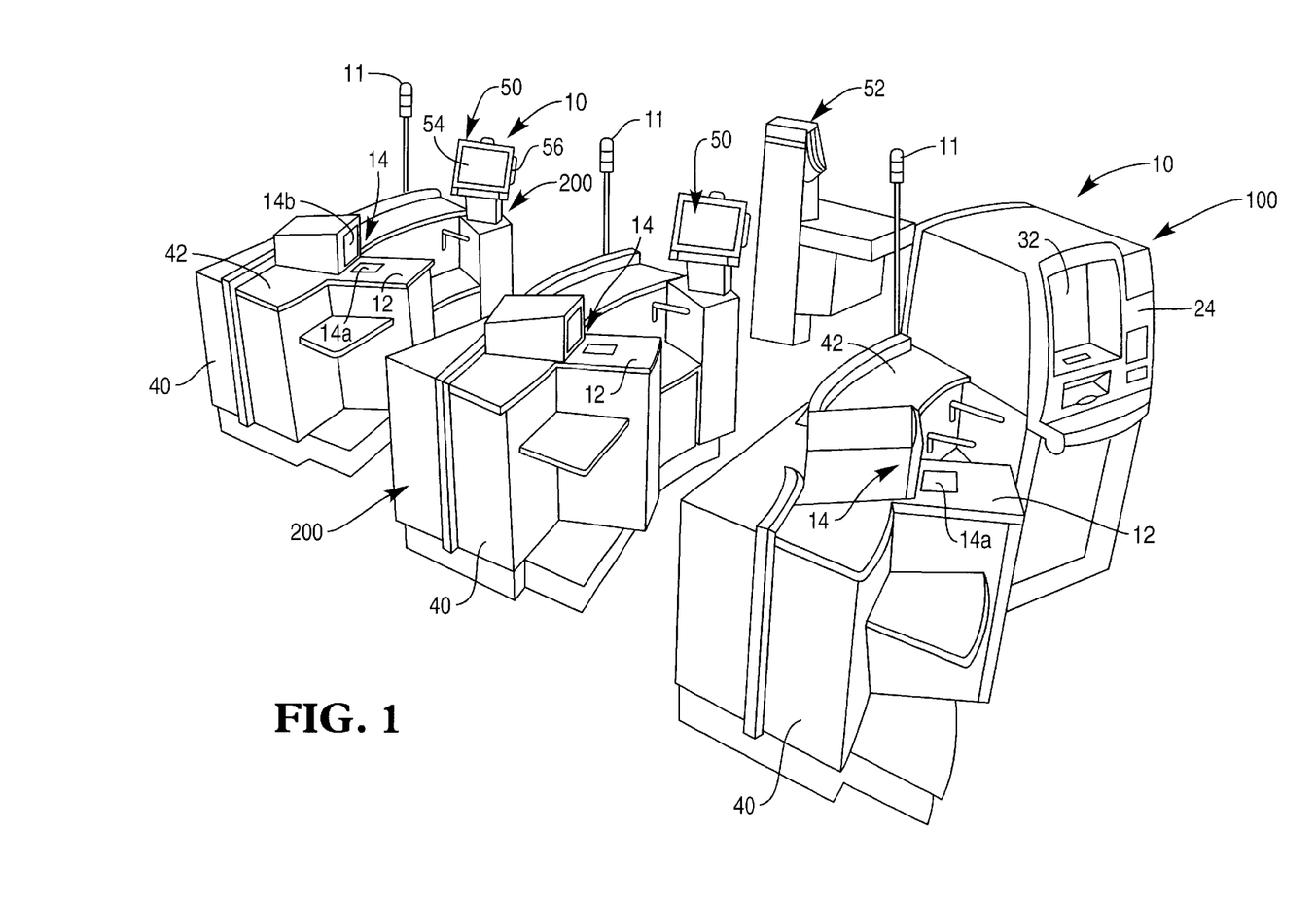
FIG. 1 is a perspective view of a retail system which incorporates the features of the present invention therein.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 1. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item) in a known manner.

The display monitors 32, 54 display instructions which serve to guide a customer through a checkout procedure. For example, an instruction is displayed on the display monitors 32, 54 which instructs the customer to enter an item into the self-service checkout systems 100, 200 by either passing the item over the scanner 14, or placing the item on the product scale 12 in order to obtain the weight of the item. The display monitors 32, 54 are preferably is known touch screen monitors which can generate data signals when certain areas of the screen are touched by a customer.

The status light device 11 is provided in order to notify store personnel, such as a customer service manager, if intervention into the customer's transaction is needed. In particular, the status light device 11 may display a first colored light in order to notify store personnel that intervention is needed prior to the end of the customer's transaction. Alternatively, the status light device 11 may display a second colored light in order to notify store personnel that intervention is needed immediately.

The security device 48 provides security from improprieties, such as theft, during operation of the self-service checkout systems 100, 200. The security device 48 may be a weight scale which monitors the weight of items placed in the bagwell 38 (i.e. into one of the grocery bags) or onto the portion of the counter 42 which is located proximate the bagwell 38. It should be appreciated that a customer may place an item onto the portion of the counter 42 proximate the bagwell 38 subsequent to entering the item, but prior to placing the item into a grocery bag. For example, if a customer scans a loaf of bread, the customer may want to place the bread onto the portion of the counter 42 proximate the bagwell 38 until one of the grocery bags is nearly full thereby preventing the bread from being crushed. Hence, the scale 48 may be utilized to monitor the ingress and egress of items into and out of the bagwell 38 along with onto and off of the counter 42. Such monitoring is particularly useful for preventing items which have not been scanned from being placed into a grocery bag.

The security device 48 may also be embodied as numerous other types of devices. For example, the security device 48 may be embodied as a video system which captures video images associated with movement or placement of items throughout the area proximate the self-service checkout system 10. Moreover, the security device 48 may be embodied as a light curtain device which is 'tripped' when items are placed into or removed from the bagwell 38 or placed onto or off of the counter 42.

Figure 5:
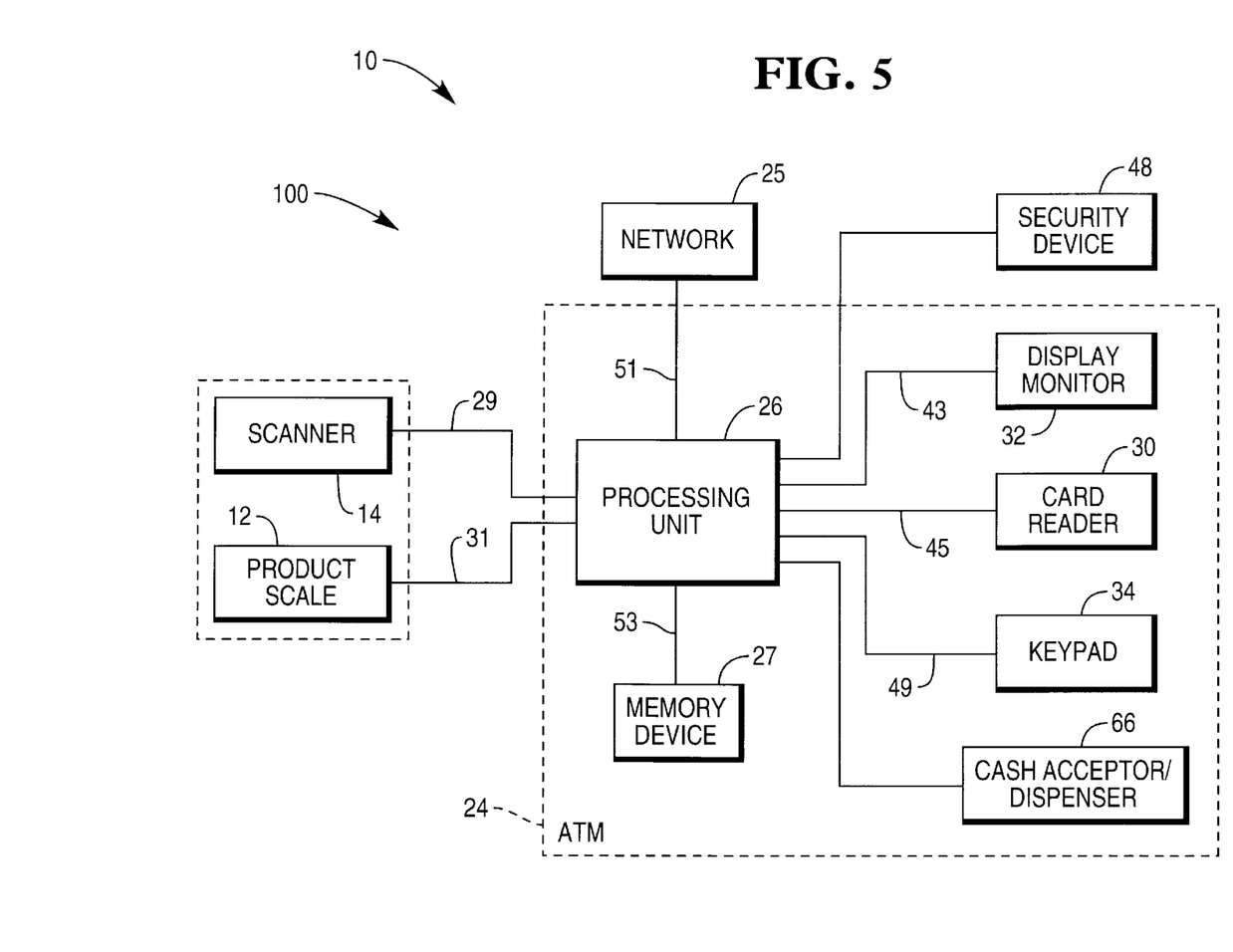
FIG. 5 is a simplified block diagram of the full-tendering self-service checkout system of FIG. 2.

Referring now to FIG. 5, there is shown a simplified block diagram of the full-tendering self-service checkout system 100. The processing unit 26 of the ATM 24 is electrically coupled to the product scale 12, the scanner 14, the card reader 30, the display monitor 32, the keypad 34, and the security device 48. The processing unit 26 is also electrically coupled to a network 25 and a memory device 27.

The processing unit 26 monitors output signals generated by the scanner 14 via a communication line 29. In particular, when the customer scans an item which includes a product identification code across the scanning windows 14a, 14b, an output signal indicative of the product identification code is generated on the communication line 29. As shall be discussed below in greater detail, the communication line 29 is utilized to couple the scanner 14 to the processing unit 58 of the kiosk-type information terminal 50 when the self-service checkout system 10 is configured as a itemization-only self-service checkout system 200.

The processing unit 26 is coupled to the product scale 12 via a data communication line 31. In particular, when a customer places an item on the product scale 12, the product scale 12 generates an output signal on the data communication line 31 indicative of the weight of the item. As shall be discussed below in greater detail, the communication line 31 is utilized to couple the product scale 12 to the processing unit 58 of the kiosk-type information terminal 50 when the self-service checkout system 10 is configured as a itemization-only self-service checkout system 200.

The processing unit 26 communicates with the display monitor 32 through a data communication line 43. The processing unit 26 generates output signals on the data communication line 43 which cause various instructional messages to be displayed on the display monitor 32. As alluded to above, the display monitor 32 may include known touch screen technology which can generate output signals when the customer touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, instructional messages may be generated with a voice generating device (not shown) or an audible tone generating device (not shown).

The keypad 34 is coupled to the processing unit 26 through a data communication line 49. The keypad 34 may include one or more of a known keypad or a touch pad. It should be appreciated that the touch screen associated with the display monitor 32 and the keypad 34 define input devices which may be utilized by a customer to input information associated with operation of the full-tendering self-service checkout system 100.

Moreover, the card reader 30 is coupled to the processing unit through a data communication line 45. The card reader 30 may include a known credit, debit, loyalty, and/or smart card reader which is capable of reading information stored on the customer's card.

The processing unit 26 includes network interface circuitry (not shown) which conventionally permits the full-tendering self-service checkout system 100 to communicate with the retailer's network 25 such as a LAN or WAN through a wired connection 51. As shall be discussed further below, the processing unit 26 communicates with the retailer's network 25 during the checkout procedure in order to obtain information, such as pricing information, associated with an item being scanned or otherwise entered, and also to verify customer credit approval when appropriate. The network interface circuitry associated with the full-tendering self-service checkout system 100 may include a known Ethernet expansion card, and the wired connection 51 may include a known twisted-pair communication line. Alternatively, the network interface circuitry may support wireless communications with the retailer's network 25.

The processing unit 26 communicates with the memory device 27 via a data communication line 53. The memory device 27 is provided to maintain an electronic transaction table which includes a record of the product information associated with each item that is scanned, weighed, or otherwise entered during the user's use of the full-tendering self-service checkout system 100. For example, if the user scans a can of soup, the description of the soup and the pricing information associated therewith is recorded in the transaction table in the memory device 27. Similarly, if the user weighs a watermelon with the product scale 12 and then enters a product lookup code associated with watermelon via the data input device 34, product information associated with the watermelon is recorded in the transaction table. Moreover, if a user entered a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the user pays for his or her transaction. Moreover, data stored in the transaction table is printed out on the printer 36 thereby generating a receipt for the user at the end of his or her transaction.

Figure 6:
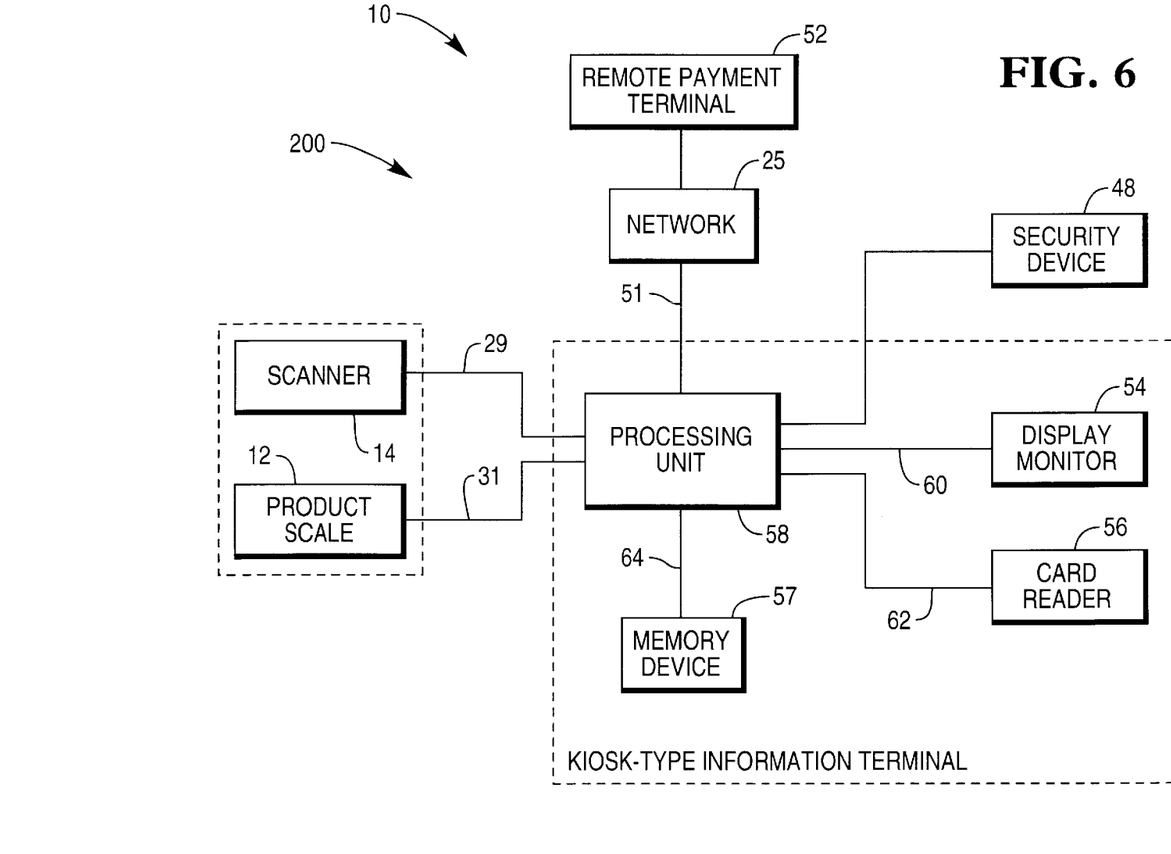
FIG. 6 is a simplified block diagram of the itemization-only self-service checkout system of FIG. 3.

Referring now to FIG. 6, there is shown a simplified block diagram of the itemization-only self-service checkout system 200. The kiosk-type information terminal 50 includes the processing unit 58 which is, in essence, a modified flat panel personal computer (PC), and includes a number of components commonly associated therewith. Moreover, the processing unit 58 of the kiosk-type information terminal 50 is electrically coupled to the product scale 12, the scanner 14, the card reader 56, the display monitor 54, and the security device 48. The processing unit 58 is also electrically coupled to the retailer's network 25 and a memory device 57.

Similarly to the processing unit 26, the processing unit 58 monitors output signals generated by the scanner 14 via the communication line 29. In particular, when the customer scans an item which includes a product identification code across the scanning windows 14a, 14b, an output signal indicative of the product identification code is generated on the communication line 29.

The processing unit 58 is coupled to the product scale 12 via the data communication line 31. In particular, when a customer places an item on the product scale 12, the product scale 12 generates an output signal on the data communication line 31 indicative of the weight of the item.

The processing unit 58 communicates with the display monitor 54 through a data communication line 60. The processing unit 58 generates output signals on the data communication line 60 which cause various instructional messages to be displayed on the display monitor 54. As alluded to above, the display monitor 54 includes known touch screen technology which can generate output signals when the customer touches a particular area of the display screen associated with the display monitor 54. The signals generated by the display monitor 54 are transmitted to the processing unit 58 via the data communication line 60.

Moreover, the card reader 56 is coupled to the processing unit through a data communication line 62. The card reader 56 may include a known magnetic strip card reader which is capable of reading information stored on the customer's card such as a customer's loyalty card.

The processing unit 58 includes network interface circuitry (not shown) which conventionally permits the itemization-only self-service checkout system 200 to communicate with the retailer's network 25 such as a LAN or WAN through the wired connection 51. The processing unit 58 communicates with the retailer's network 25 during the checkout procedure in order to obtain information, such as pricing information, associated with an item being scanned or otherwise entered. Moreover, once the customer has entered all of his or her items for purchase, the processing unit 58 communicates with the remote payment terminal 52 such that information such as total item cost is transmitted to the remote payment terminal so as to allow the customer to tender payment for his or her items for purchase at the remote payment terminal 52. The network interface circuitry associated with the itemization-only self-service checkout system 200 may include a known Ethernet expansion card, and the wired connection 51 may include a known twisted-pair communication line. Alternatively, the network interface circuitry may support wireless communications with the retailer's network 25.

The processing unit 58 communicates with the memory device 57 via a data communication line 64. The memory device 57 is provided to maintain an electronic transaction table similar to the transaction table maintained by the memory device 27. In particular, during operation of the itemization-only self-service checkout system 200, the memory device 57 maintains a transaction table which includes a record of the product information associated with each item that is scanned, weighed, or otherwise entered during the user's use of the itemization-only self-service checkout system 200. For example, if the user scans a can of soup, the description of the soup and the pricing information associated therewith is recorded in the transaction table in the memory device 57. Similarly, if the user weighs a watermelon with the product scale 12 and then enters a product lookup code associated with watermelon via the touch screen associated with the display monitor 54, product information associated with the watermelon is recorded in the transaction table.

It should therefore be appreciated that the sum of each of the items recorded in the transaction table (1) minus any reductions (e.g. coupons), and (2) plus any applicable taxes is the amount that the user pays for his or her transaction. Moreover, data stored in the transaction table is transmitted to the remote payment terminal 52 so that the customer may tender payment for his or her items for purchase at the remote payment terminal 52.

It should be appreciated that the processing units 26, 58 associated with the ATM 24 and the kiosk-type information terminal 50, respectively, execute a number of software applications which allow for operation of the self-service checkout systems 10. Such software applications are the same irrespective of whether the self-service checkout system 10 is configured as a full-tendering self-service checkout system 100 or a itemization-only self-service checkout system 200. Such common software applications eliminate the need to create differing software versions for each configuration of the self-service checkout systems 100, 200 thereby reducing costs associated with manufacture of the system 100, 200.

For example, the processing units 26, 58 execute a security software application in order to provide security during operation of the self-service checkout systems 10. In particular, the security software application utilizes weight values generated by the security scale 48 in order to determine if the movement of items into and out of the bagwell 38 represent a security breach. For example, the processing units 26, 58 utilize the security software application to determine if an item has been placed into a grocery bag in the bagwell 38 without having first been scanned or otherwise entered into the self-service checkout system 10. As a further example, the processing units 26, 58 utilize the security software application to determine if a user voids a first item and then removes a second, different item from the grocery bag. Yet further, the processing units 26, 58 utilize the security software application to track movement of items within the bagwell 38 such as movement of items between grocery bags. Both the itemization-only self-service checkout system 200 and the full-tendering self-service checkout system 100 execute the same security software application so as to provide security to both systems 100, 200 during operation thereof.

In operation, it should be appreciated from the above discussion, that the itemization-only self-service checkout system 200 may be upgraded or otherwise altered to a full-tendering self-service checkout system 100 if so desired by the retailer. In particular, for cost or other reasons, a retailer may initially purchase one or more itemization-only self-service checkout systems 200. In such a configuration, the kiosk-type information terminal 50 is mechanically secured to the base 40 of the itemization-only self-service checkout system 200 and is electrically coupled to the product scale 12, the scanner 14, the status light device 11, and the security device 48 (e.g. the weight scale positioned in the bagwell 38). Hence, after item selection, a customer may scan or otherwise enter each of his or her items for purchase into the itemization-only self-service checkout systems 200. During such operation, the processing unit 58 associated with the kiosk-type information terminal 50 executes a number of software applications such as a pricing application and the security application so as to facilitate operation of the itemization-only self-service checkout system 200.

Once the customer has entered all of his or her items for purchase, an end-of-transaction control signal is generated and a payment ticket is printed on a printer (not shown) associated with the itemization-only self-service checkout systems 200. Thereafter, the customer takes his or her items for purchase, along with the payment ticket, to the remote payment terminal 52. The customer then presents the payment ticket to the retail clerk operating the remote payment terminal 52 and thereafter tenders payment to the retail clerk operating the remote payment terminal 52 via use of cash, check, debit card, credit, or smart card.

If at a later date the retailer desires to convert one or more of his itemization-only self-service checkout systems 200 to a full-tendering self-service checkout system 100, the retailer must simply swap the retail terminals associated with the self-service checkout system 10. In particular, the kiosk-type information terminal 50 is first electrically decoupled from the product scale 12, the scanner 14, the status light device 11, and the security device 48 by removing the cables associated with each of the components from the connectors (not shown) associated with the terminal 50. Thereafter, the kiosk-type information terminal 50 is mechanically unsecured from base 40 such that the terminal 50 may be lifted or otherwise removed from the base 40.

Once the kiosk-type information terminal 50 has been removed, the ATM 24 is first mechanically secured to the base 40. Thereafter, the product scale 12, the scanner 14, the status light device 11, and the security device 48 are coupled to the ATM 24 by securing the cables associated with each of the components to the communication connectors (not shown) associated with the ATM 24. Once coupled in such a manner, the ATM 24 may be utilized to operate the full-tendering self-service checkout system 100 in the manner described above. In particular, a customer may scan or otherwise enter his or her items for purchase into the system 100. Once the last of the customer's items have been entered into the system 100, an end-of-transaction control signal is generated thereby causing the system 100 to be operated such that the customer may tender payment for his or her items for purchase at the ATM 24. In particular, the customer may pay for his or her items with a credit, debit, or smart card by use of the card reader 30. Alternatively, the customer may operate a cash acceptor/dispenser device 66 by inserting cash into a slot associated therewith. In the case of where the customer inserts cash into the cash acceptor/dispenser device 66, change may be provided via use of a currency dispenser and coin dispenser included in the cash acceptor/dispenser device 66.

As described herein, operation of the self-service checkout systems 100, 200 according to the present invention described herein has numerous advantages over heretofore designed retail systems. For example, a retailer may lower his initial investment by purchasing itemization-only self-service checkout systems 200 and thereafter upgrading to full-tendering self-service checkout systems if he so desires. The ability to upgrade in such a manner allows a retailer to determine whether or not the retailer's customers are going to embrace the idea of a self-service checkout system while reducing the costs of the initial system.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

What is claimed is:

1. A method of operating a self-service checkout system having a scanner, comprising the steps of:

coupling an itemization-only retail terminal to said scanner;

operating said itemization-only retail terminal and said scanner so as to allow a first user to enter a first number of items for purchase into said self-service checkout system for a first time period while said itemization-only retail terminal is coupled to said scanner;

decoupling said itemization-only retail terminal from said scanner;

coupling a full-tendering retail terminal to said scanner; and operating said full-tendering retail terminal and said scanner so as to allow a second user to enter a second number of items for purchase into said self-service checkout system for a second time period while said full-tendering retail terminal is coupled to said scanner.

2. The method of claim 1, wherein:

said self-service checkout system further has a base having a counter secured thereto, said scanner is secured to said counter, said step of coupling said itemization-only retail terminal to said scanner includes the step of securing said itemization-only retail terminal to said base, and said step of operating said itemization-only retail terminal and said scanner so as to allow said first user to enter said first number of items for purchase into said self-service checkout system includes the step of operating said itemization-only retail terminal and said scanner so as to allow said first user to enter said first number of items for purchase into said self-service checkout system for said first time period while (i) said itemization-only retail terminal is electrically coupled to said scanner, and (ii) said itemization-only retail terminal is secured to said base.

3. The method of claim 2, wherein:

said step of decoupling said itemization-only retail terminal from said scanner includes the step of detaching said itemization-only retail terminal from said base, said step of coupling said full-tendering retail terminal to said scanner includes the step of securing said full-tendering retail terminal to said base, and said step of operating said full-tendering retail terminal and said scanner so as to allow said second user to enter said second number of items for purchase into said self-service checkout system includes the step of operating said full-tendering retail terminal and said scanner so as to allow said second user to enter said second number of items for purchase into said self-service checkout system for said second time period while (i) said full-tendering retail terminal is electrically coupled to said scanner, and (ii) said full-tendering retail terminal is secured to said base.

4. The method of claim 1, wherein said self-service checkout system further has a security device, further comprising the steps of:

coupling said itemization-only retail terminal to said security device;

operating said security device so as to provide security to self-service checkout system during said first time period while said itemization-only retail terminal is coupled to said security device;

decoupling said itemization-only retail terminal from said security device;

coupling said full-tendering retail terminal to said security device; and operating said security device so as to provide security to said self-service checkout system during said second time period while said full-tendering retail terminal is coupled to said security device.

5. The method of claim 1, further comprising the steps of:

generating an end-of-transaction control signal when a last item associated with said first number of items for purchase has been scanned with said scanner; and operating said itemization-only retail terminal during said first time period so as to allow said first user to tender payment for said first number of items at a remote payment terminal in response to generation of said end-of-transaction control signal.

6. The method of claim 1, further comprising the steps of:

generating an end-of-transaction control signal when a last item associated with said second number of items for purchase has been scanned with said scanner; and operating said full-tendering retail terminal during said second time period so as to allow said second user to tender payment for said second number of items with said full-tendering retail terminal in response to generation of said end-of-transaction control signal.

7. A method of operating a self-service checkout system which includes a base having a scanner secured thereto, comprising the steps of:

securing an itemization-only retail terminal to said base;

coupling said itemization-only retail terminal to said scanner;

operating said itemization-only retail terminal and said scanner so as to allow a first user to enter a first number of items for purchase into said self-service checkout system for a first time period while (i) said itemization-only retail terminal is secured to said base, and (ii) said itemization-only retail terminal is coupled to said scanner;

detaching said itemization-only retail terminal from said base;

decoupling said itemization-only retail terminal from said scanner;

securing a full-tendering retail terminal to said base;

coupling said full-tendering retail terminal to said scanner; and operating said full-tendering retail terminal and said scanner so as to allow a second user to enter a second number of items for purchase into said self-service checkout system for a second time period while (i) said full-tendering retail terminal is secured to said base, and (ii) said full-tendering retail terminal is coupled to said scanner.

8. The method of claim 7, wherein said self-service checkout system further has a security device, further comprising the steps of:

coupling said itemization-only retail terminal to said security device;

operating said security device so as to provide security to said self-service checkout system during said first time period while said itemization-only retail terminal is coupled to said security device;

decoupling said itemization-only retail terminal from said security device;

coupling said full-tendering retail terminal to said security device; and operating said security device so as to provide security to said self-service checkout system during said second time period while said full-tendering retail terminal is coupled to said security device.

9. The method of claim 7, further comprising the steps of:

generating an end-of-transaction control signal when a last item associated with said first number of items for purchase has been scanned with said scanner; and operating said itemization-only retail terminal during said first time period so as to allow said first user to tender payment for said first number of items at a remote payment terminal in response to generation of said end-of-transaction control signal.

10. The method of claim 7, further comprising the steps of:

generating an end-of-transaction control signal when a last item associated with said second number of items for purchase has been scanned with said scanner; and operating said full-tendering retail terminal during said second time period so as to allow said second user to tender payment for said second number of items with said full-tendering retail terminal in response to generation of said end-of-transaction control signal.

\* \* \* \* \*